Oct. 27, 1959   A. WINDMAN ET AL   2,910,102
SEVERED PIECE DISLODGING MECHANISM FOR PEAR STEM END CUTTERS
Filed July 11, 1957   2 Sheets-Sheet 1
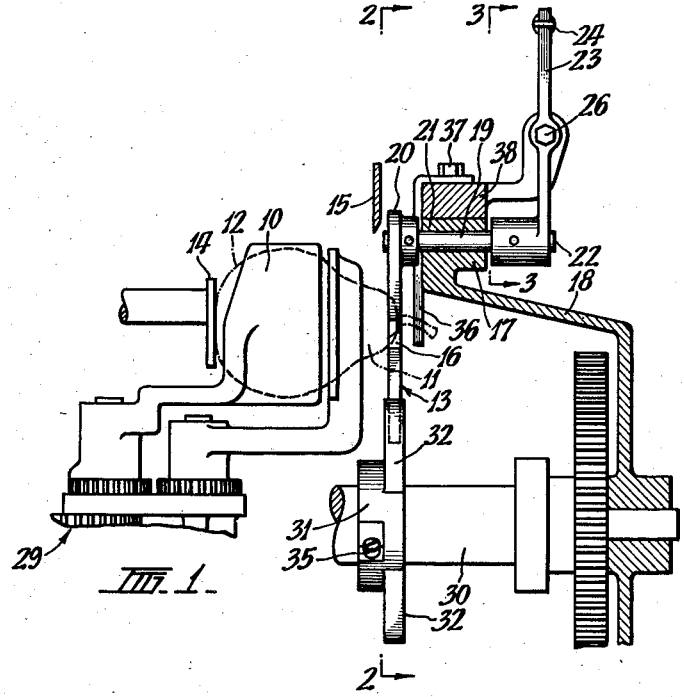
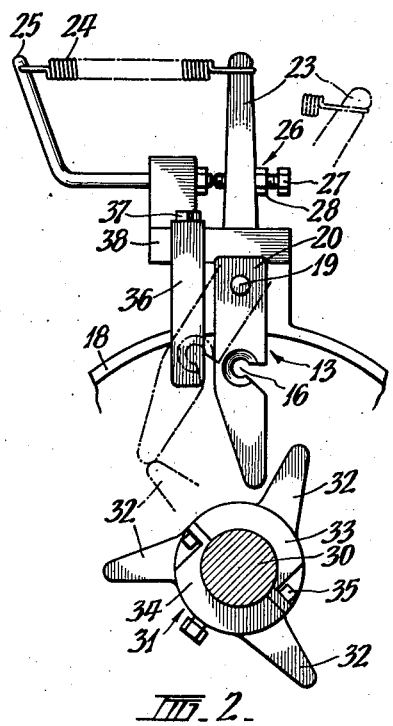
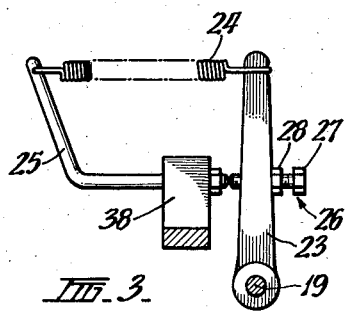
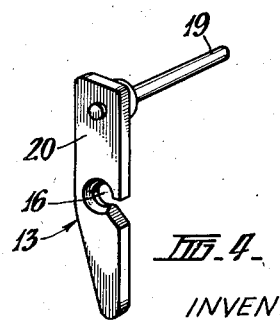
INVENTORS:
ALBERT WINDMAN &
MARK AMSTERDAMER
BY Oberlin & Limbach
ATTORNEYS

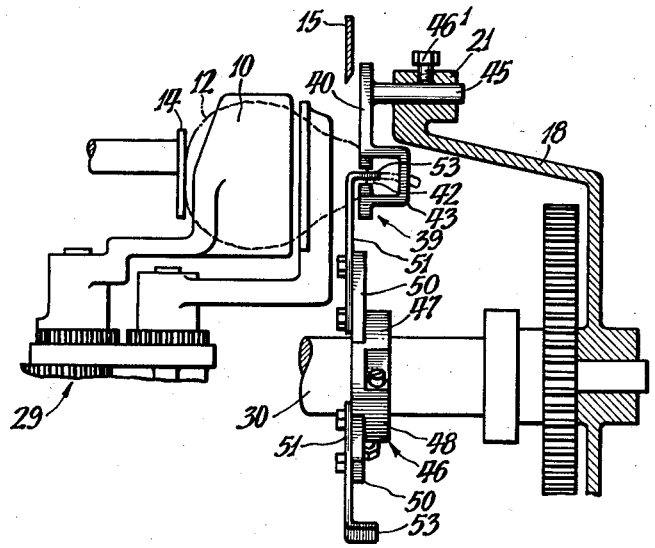
Fig. 5
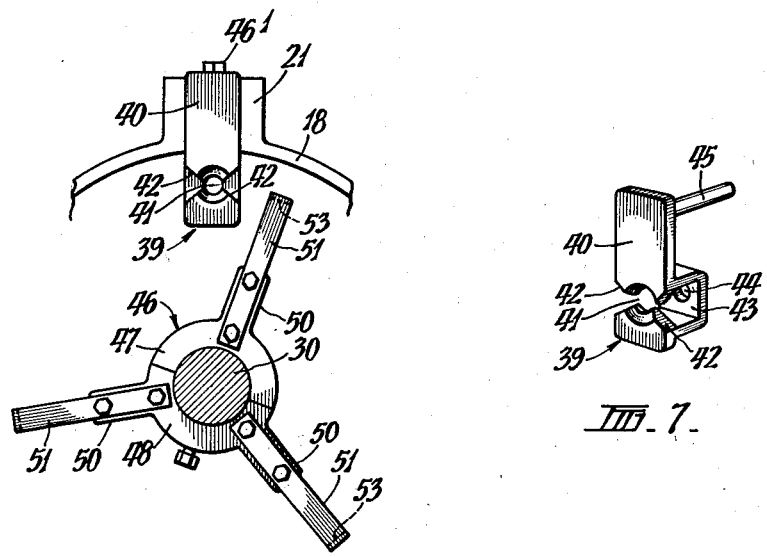
Fig. 6
Fig. 7

United States Patent Office 2,910,102
Patented Oct. 27, 1959

2,910,102

SEVERED PIECE DISLODGING MECHANISM FOR PEAR STEM END CUTTERS

Albert Windman and Mark Amsterdamer, both of Yarraville, Victoria, Australia

Application July 11, 1957, Serial No. 671,185

Claims priority, application Australia January 24, 1957

8 Claims. (Cl. 146—81)

This invention relates to pear treatment machines for stemming, peeling, splitting, and coring pears in preparation for canning or like preserving process and is directed to that type of machine having a multiple station cup feed turret to receive the pears to intermittently deliver the pears to positions for stemming and impaling on stem tubes mounted on a main turret where the pears are subjected to subsequent peeling, splitting, and coring operations.

In pear treatment machines of this type the cup feed turret is mounted on an axis parallel to the axis of the main turret and has mounted thereon a number of feed cups which are each indexed in turn into a feed position where a pear to be treated is placed into a feeding cup. In the next index of the feed turret the feed cup returns to a horizontal position at the stem cut-off station.

At the stem cut-off station, the stem-end of the pear engages a recess in a stop plate, said recess being adapted to receive the stem of a pear while part of the sides of said recess are inclined to form a tapered socket adapted to receive the top end of the neck of the pear.

At this position the end of the pear is severed from the stem and upon the movement of the pear and the cup to the next index of the feed turret the stem and attached part of the neck of the pear are intended to fall as waste. However, it frequently happens that the stem and severed part of the pear do not become detached from the stop-plate so that the engagement of the next pear with the stop-plate is impeded with the likelihood of damage to the succeeding pear, or pears, and causing faulty operation of the machine at this treatment station and the spoiling of good fruit.

The principal object of the present invention is to provide a relatively simple attachment for pear treatment machines of the type described to ensure correct operation of the machine at the stemming station and which may be conveniently and economically installed.

According to the present invention there is provided in pear treatment machines of the type having a multiple station cup feed turret to receive individual pears at a feeding station and intermittently deliver the pears in sequence to a stemming station and to a transfer station where the pears are impaled on stem tubes mounted on a main turret whereon the pears are subjected to subsequent peeling, splitting and coring operations, the improvement comprising an arm mounted relatively to the cup feed turret and indexed therewith so that upon completion of the stemming operation said arm co-operates with a stop-plate to ensure the dislodgment of the severed part of the pear therefrom.

In one arrangement the stop-plate is arranged to receive an intermittent jolting movement by the index arm.

In another arrangement the stop-plate is adapted to retain the severed end of the pear therein, a clearance or aperture being provided to permit part of the index arm to pass therethrough and thereby positively effect dislodgment of the severed part of the pear.

In order that the invention may be more readily understood reference will now be made to the accompanying drawings illustrating practical embodiments of the invention and in which only the relevant parts of a pear treating machine of the type referred to are shown.

In these drawings:

Fig. 1 is a fragmentary elevation, partly in section of one feed cup at the stemming station, with the stem end of a pear in engagement with the stop-plate, which is pivotally mounted and a number of indexing arms, mounted on the shaft carrying the feed turret, to index therewith.

Fig. 2 is a view taken on line 2—2 of Fig. 1 showing the stop-plate in front elevation and a co-operating fixed plate.

Fig. 3 is a detail view of the pivotal mounting for the stop-plate and

Fig. 4 is a detail perspective view of the stop-plate.

Fig. 5 is a similar view to Fig. 1 showing a modified form of stop plate and indexing arm, Fig. 6 is a detail sectional view showing in end elevation the modified stop-plate and arm shown in Fig. 5 and Fig. 7 is a detail perspective view of the modified form of stop-plate.

In the embodiment illustrated in Figs. 1 to 4 there is shown in Fig. 1 the feed cups 10 at the stemming station when the cups 10 hold the stem-end 11 of a pear 12 into engagement with a stop-plate 13 by means of the pusher 14.

At this position of the pear 12 the knife 15 is advanced to sever the stem-end of the pear in the usual and known manner and the feed cups subsequently advance to the transfer station (not shown) where the pear is impaled on a stem tube mounted on a main turret (not shown) by means of transfer pusher.

As shown in Fig. 1 the stop-plate 13 at the stemming station, as above described, is located in the usual position and is provided with the usual stem receiving recess 16, the stop-plate is, however, pivotally mounted at 17 on a fixed part 18 of the frame of the machine. The pivotal mounting 17 is provided by a shaft 19 fixed to the upper end 20 of the stop-plate 13, said shaft extending forwardly through a bearing 21, the extending end 22 of the shaft 19 having fixed thereto a lever arm 23, the upper free end of which is connected to a tension spring 24 which at the other end is connected to a fixed arm 25.

The lever arm 23 is provided with an adjustable stop 26 in the form of a bolt 27 and lock-nut 28, said bolt being adapted to contact a fixed point and against which the lever arm 23 is normally held by the tension spring 24. The adjustable stop 26 serves to accurately position the stop-plate in position to receive the stem-end 11 of the pear upon the feed turret 29 indexing to the stemming position.

Mounted on the feed turret shaft 30 is a split boss 31 having a number of arms 32 projecting therefrom and adapted to contact the stop-plate 13 to deflect the latter on its pivot 17 upon the feed turret 29 moving to its next index. The sudden return of the stop-plate 13 to normal by the tension spring 24 jolts the said plate and displaces the severed part of the pear therefrom. The two halves 33 and 34 are bolted together by screws 35 to embrace the feed turret shaft 30 so that it may be installed without dissembling any part of the machine.

The number of arms 32 on the split boss 31 will correspond to the number of index movements of the feed turret 29.

To ensure the displacement of the severed piece of pear from the stop-plate 13 the latter is preferably deflected to move past a fixed plate 36 arranged in the same plane as the stop-plate 13 and just in advance of the stem receiving aperture 16 therein so that as the stop-plate is deflected on its pivot 17 by the arm 32 the stem on the severed part of the pear contacts the fixed plate 36 to thereby ensure that the severed part of the pear is dislodged.

The fixed plate 36 comprises an angle plate secured by bolt 37 to member 38 which supports the fixed arm 25 and constitutes a fixed point for the adjustable stop 26.

In the modified arrangement shown in Figs. 5 to 7 a modified form of stop-plate 39 is employed which is located relatively to the indexing position of the feed turret 29.

The stop-plate 39 in this arrangement comprises a plate 40 having a tapered aperture 41 having a V-shaped opening 42 on each side thereof, a channel shaped integral member 43 at the back of the plate 40 connecting the parts of the plate on each side of the aperture 41 together. An opening 44 is formed in the channel member 43 to receive the stem of a pear. The formation of the pear receiving aperture 41 and the stem receiving opening 44 will tend to retain the severed end of the pear in position. The stop-plate 39 is, however, mounted for lateral and radial adjustment movements on the fixed part 18 of the frame of the machine. The mounting is provided by a shaft 45 fixed to the upper end of the stop-plate 39, said shaft extending forwardly through the bearing 21, the extending end of the shaft being fixed in position by a set screw 46' at a required lateral or radial adjusted position by the set screw 46'.

Mounted on the feed turret shaft 30 is a split boss 46 the two parts 47 and 48 of which are adapted to be clamped onto the shaft 30 by means of screws 49. The split boss 46 is provided with a number of radial projections 50 corresponding in number to the number of index movements of the feed turret 29. Each projection 50 has adjustably secured thereon an arm 51 the outer end of which is adapted to move over the forward face of the stop-plate 39, an angularly projecting portion 53 of said arm is arranged to pass between the side openings 42 in the stop plate and during operation of the machine said arms move according to the index movements of the feed turret 29 to dislodge any severed pear end retained in the stop-plate 39 after the completion of the severing operation.

A standard stop-plate may be retained on the machine in which case the dislodging arms 51 are not provided with an angularly projecting portion 53 but move across the face of the stop plate to dislodge any severed pear end therefrom.

It will be apparent that mounting of the stop-plates 13 and 39 above described and the pear end dislodging arms 32 and 51 are of simple construction and capable of being readily attached to a pear treatment machine without any rebuilding thereof so that the proper operation of the machine at the stemming station will be ensured.

What we claim is:

1. Stem cut-off mechanism for pear treatment machines and the like, comprising a holder adapted to support a pear with its stem portion exposed for severing by a knife, a plate formed with an aperture to receive the stem-end of the pear as thus supported by said holder, said plate being further provided with a notch in an edge thereof which extends to such aperture, a wiper member normally spaced from said plate, means mounting said plate and wiper member for relative movement such that a severed piece of pear remaining in the plate is engaged by the wiper member to dislodge the same, and drive means for intermittently relatively moving said plate and wiper member in such manner.

2. Stem cut-off mechanism for pear treatment machines and the like, comprising a holder adapted to support a pear with its stem portion exposed for severing by a knife, a plate formed with an aperture to receive the stem-end of the pear as thus supported by said holder, said plate being further provided with a notch in an edge thereof which extends to such aperture, means mounting said plate for oscillating movement, a stationary wiper member positioned to engage a severed piece of pear remaining in the plate when the latter is oscillated to dislodge such piece, and drive means for intermittently oscillating the plate.

3. Stem cut-off mechanism for pear treatment machines and the like comprising a holder adapted to support a pear with its stem portion exposed for severing by a knife, a plate formed with an aperture to receive the stem-end of the pear as thus supported by said holder, said plate further having lateral passages at each side of such aperture to form with the latter a continuous recess across the plate, a wiper member adapted to move through such recess to engage and dislodge a severed piece of pear remaining in the plate, and drive means for intermittently thus moving the wiper member to traverse the plate.

4. Stem cut-off mechanism for pear treatment machines and the like comprising a holder adapted to support a pear with its stem portion exposed for severing by a knife, a plate formed with an aperture to receive the stem-end of the pear as thus supported by said holder, means pivotally mounting said plate including a stop and a spring urging the plate against such stop, and actuator means operative to deflect the plate away from the stop and then release the same, the spring returning the plate with a jolt to its normal position against the stop.

5. The combination set forth in claim 4 characterized further by the provision of means for adjusting said stop to vary the normal position of said plate.

6. Stem cut-off mechanism for pear treatment machines and the like, comprising a holder adapted to support a pear with its stem portion exposed for severing by a knife, a plate formed with an aperture to receive the stem-end of the pear as thus supported by said holder, means pivotally mounting said plate including a stop and a spring urging the plate against such stop, and rotary actuator means having a plurality of arms disposed sequentially to strike and deflect said plate away from the stop, the plate upon release by each arm being returned by the spring with a jolt to its normal position against the stop.

7. Stem cut-off mechanism for pear treatment machines and the like, comprising a holder adapted to support a pear with its stem portion exposed for severing by a knife, a plate formed with an aperture to receive the stem-end of the pear as thus supported by said holder, said plate having lateral passages at each side of such aperture to form with the latter a continuous recess across the plate, and rotary actuator means including a plurality of arms adapted sequentially upon rotation to move through such recess, thereby to engage and dislodge severed pieces of pear remaining in the plate.

8. The combination set forth in claim 7 characterized further in that said arms are radially adjustable.

References Cited in the file of this patent
UNITED STATES PATENTS

| | | |
|---|---|---|
| 2,321,590 | Ewald | June 15, 1943 |
| 2,341,857 | Drake et al. | Feb. 15, 1944 |
| 2,827,937 | Luhdorff et al. | Mar. 25, 1958 |
| 2,860,676 | Coons et al. | Nov. 18, 1958 |